(12) United States Patent
Harley et al.

(10) Patent No.: US 7,380,722 B2
(45) Date of Patent: Jun. 3, 2008

(54) STABILIZED LASER POINTER

(75) Inventors: Jonah Harley, Mountain View, CA (US); John Stewart Wenstrand, Menlo Park, CA (US); Ken A. Nishimura, Fremont, CA (US)

(73) Assignee: Avago Technologies ECBU IP Pte Ltd, Singapore (SG)

( * ) Notice: Subject to any disclaimer, the term of this patent is extended or adjusted under 35 U.S.C. 154(b) by 0 days.

(21) Appl. No.: 11/194,001

(22) Filed: Jul. 28, 2005

(65) Prior Publication Data

US 2007/0023527 A1    Feb. 1, 2007

(51) Int. Cl.
    G06K 9/22    (2006.01)
(52) U.S. Cl. .................. 235/462.45; 235/472.01; 235/462.2; 235/462.21; 353/42; 715/863; 362/259
(58) Field of Classification Search .......... 235/462.45, 235/472.01; 353/42; 350/16; 715/863; 84/724; 362/259; 356/375; 345/179
    See application file for complete search history.

(56) References Cited

U.S. PATENT DOCUMENTS

| | | | | |
|---|---|---|---|---|
| 4,322,128 A * | 3/1982 | Brake | ........................ | 359/555 |
| 5,450,148 A * | 9/1995 | Shu et al. | ...................... | 353/42 |
| 5,656,805 A * | 8/1997 | Plesko | .................... | 235/472.03 |
| 6,166,809 A * | 12/2000 | Pettersen et al. | ........... | 356/612 |
| 6,453,173 B1 * | 9/2002 | Reber et al. | ................ | 455/557 |
| 6,577,299 B1 * | 6/2003 | Schiller et al. | ............. | 345/179 |
| 6,990,639 B2 * | 1/2006 | Wilson | ....................... | 715/863 |
| 7,060,887 B2 * | 6/2006 | Pangrle | ........................ | 84/724 |
| 2003/0080193 A1 * | 5/2003 | Ryan et al. | .................. | 235/491 |
| 2004/0151218 A1 * | 8/2004 | Branzoi et al. | ............... | 372/25 |
| 2005/0099607 A1 | 5/2005 | Yokote et al. | | |
| 2005/0128749 A1 * | 6/2005 | Wilson et al. | .............. | 362/259 |

FOREIGN PATENT DOCUMENTS

| | | |
|---|---|---|
| EP | 1 452 902 | 9/2004 |
| JP | 02 280112 | 11/1990 |
| JP | 06 175076 | 6/1994 |
| JP | 07 134270 | 5/1995 |
| JP | 07 239660 | 9/1995 |
| JP | 07 027999 | 10/1995 |
| JP | 09 281436 | 10/1997 |
| JP | 11 085007 | 3/1999 |
| JP | 2000 284220 | 10/2000 |
| WO | WO 2004/059560 | 7/2004 |

OTHER PUBLICATIONS

Search report from corresponding EP application No. EP 06 25 3921 dated Nov. 3, 2006.

* cited by examiner

*Primary Examiner*—Michael G. Lee
*Assistant Examiner*—Kristy A. Haupt

(57) ABSTRACT

A pointing device having a laser in a handheld housing is disclosed. The laser generates a light beam that exits the housing. A beam steering assembly causes the light beam to move relative to the housing. The pointer includes a housing orientation sensor that measures the orientation of the housing. A controller operates the beam steering assembly to compensate for changes in the housing orientation. Embodiments based on housing orientation sensors constructed from a gyroscope and a camera are described. In addition to stabilizing the light beam location, embodiments in which the beam steering assembly also causes the light beam to execute a fixed pattern can also be constructed.

19 Claims, 5 Drawing Sheets

STABILIZED LASER POINTER

BACKGROUND OF THE INVENTION

Individuals are often faced with making a presentation to a large audience. It has become common to utilize a projector to project images of text and the like on a large screen that is viewable by the audience. The screen is often too large, or at a distance that is too far from the lecturer, to allow the lecturer to point to a particular area on the display with a physical device such as a long rod. This problem has been overcome by utilizing inexpensive hand held laser-based pointers that project a spot of light on the screen.

These devices utilize semiconductor lasers that are powered from an internal battery and have dimensions similar to that of an ordinary pencil. The laser pointer has the advantage of being able to project a spot on a screen located far from the lecturer. In fact, such pointers are also used for pointing out stars and other objects in the sky, as the beam can be seen as it is reflected off of dust or water droplets in the atmosphere. Unfortunately, small movements of the lecturer's hand translate into large movements of the light spot on the screen because the relatively large distance between the screen and the lecturer amplifies any shaking or other rotational movement of the hand. Hence, the point of light tends to move around the correct area on the screen. Such movement is distracting to the audience.

Laser pointers are also used to emphasize text or other areas of a display. For example, a lecturer can emphasize a particular word on a screen by rapidly moving the light spot back and forth under the word to underline the word. The lecturer may also circle a word by moving her hand such that the spot executes a circle on the screen. Such techniques require practice on the part of the lecturer to execute, and hence, are not easily executed by the occasional user. In addition, these higher functions can result in fatigue of the lecturer's hand muscles, since the beam must be moved with sufficient speed to give the impression of a stationary illumination pattern.

SUMMARY OF THE INVENTION

The present invention includes a pointing device having a laser in a handheld housing. The laser generates a light beam that exits the housing. A beam steering assembly causes the light beam to move angularly relative to the housing. The pointer includes a housing orientation sensor that measures the orientation of the housing. A controller operates the beam steering assembly to compensate for changes in the housing orientation. Embodiments based on housing orientation sensors constructed from a gyroscope and a camera are described. In addition to stabilizing the light beam location, embodiments in which the mirror assembly also causes the light beam to execute some fixed pattern can also be constructed.

DETAILED DESCRIPTION OF THE PREFERRED EMBODIMENTS OF THE INVENTION

Figure 1:
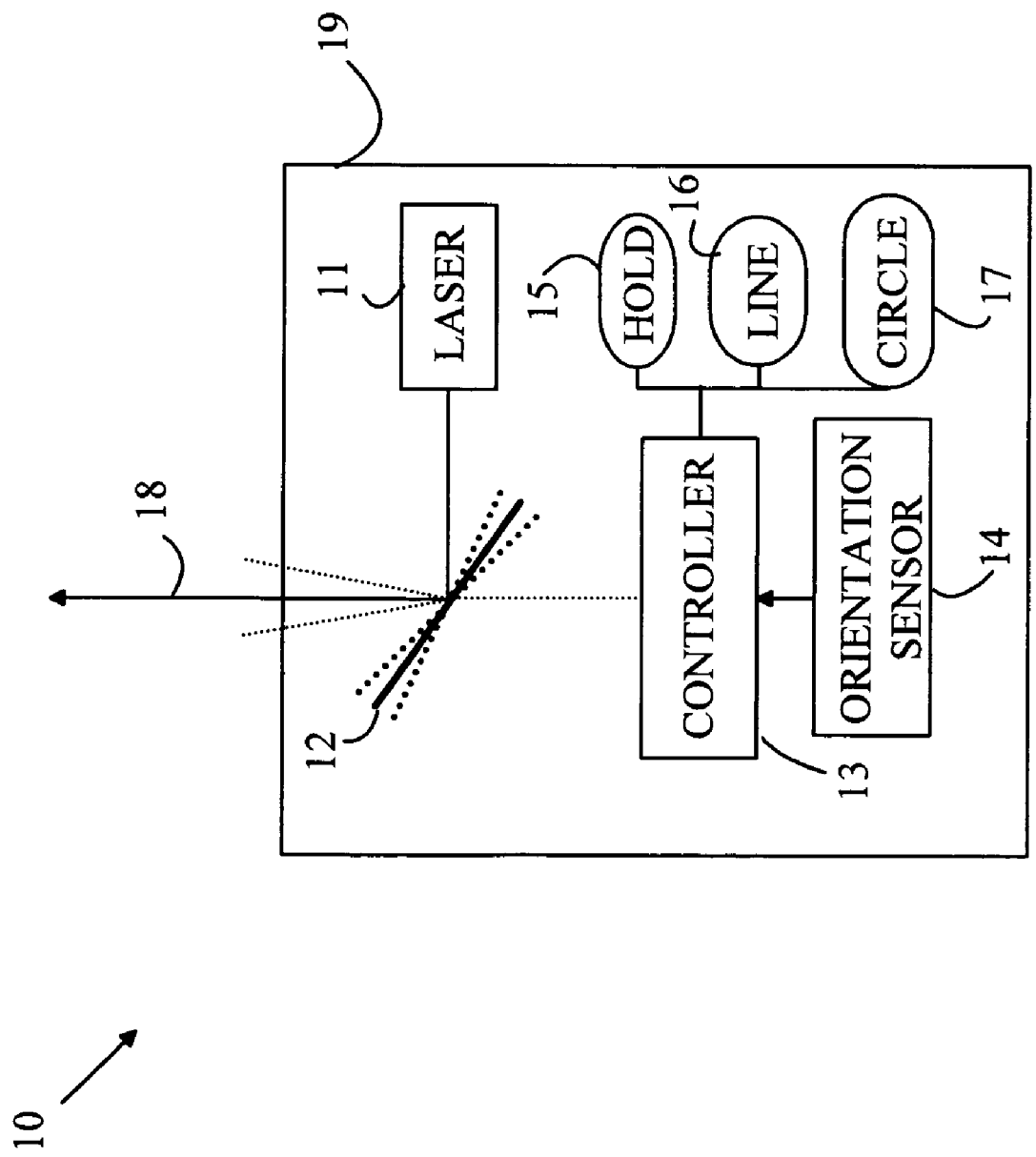
FIG. 1 is a block diagram of a laser pointer 10 according to one embodiment of the present invention.

The manner in which the present invention provides its advantages can be more easily understood with reference to FIG. 1, which is a block diagram of a laser pointer 10 according to one embodiment of the present invention. Laser pointer 10 includes a housing 19 that contains a semiconductor laser 11 and a moveable mirror 12. Mirror 12 acts as a beam steering assembly that is capable of motion in two axes such that the laser beam generated by laser 11 can be angularly steered to any orientation within a predetermined cone of angles around direction 18. Controller 13 controls the orientation of mirror 12. Mirror based beam assemblies of this type are known in the MEMs arts, and hence, will not be discussed in detail here.

Laser pointer 10 also includes a housing orientation sensor 14 that measures changes in the orientation of housing 19 relative to a fixed reference outside of housing 19. For example, housing orientation sensor 14 can be constructed from a small gyroscope. Suitable gyroscopes are also known in the MEMs arts.

In practice, the user positions the light spot from laser pointer 10 at the desired location on the screen. The user than depresses button 15 to cause controller 13 to enter a compensation mode. When in the compensation mode, controller 13 adjusts the orientation of mirror 12 in response to measured changes in the orientation of housing 19 as measured by housing orientation sensor 14. Any observed change in the orientation angle of the housing is canceled by causing mirror 12 to tilt in the opposite direction by an angular displacement that cancels the change in the orientation angle. When the user releases button 15, mirror 12 is returned to a predetermined resting location, and laser pointer 10 behaves in the same manner as a conventional laser pointer.

As noted above, laser pointers are often used to emphasize a particular area of a display by executing a predetermined movement of the beam to provide the appearance of an underline or circle around some part of the display. The present invention can also provide such functions without requiring that the user move the pointer in the desired pattern. In one embodiment of the present invention, additional functions such as underline or circle are provided by actuating buttons such as buttons 16 and 17 shown in FIG. 1. When one of these buttons is actuated, controller 13 operates mirror 12 such that the light spot on the screen moves in the desired pattern. This additional function can be coupled with the position maintaining function described above to maintain the desired pattern at a stationary position on the screen.

The above-described embodiments of the present invention utilize a MEMs gyroscope as the housing orientation sensor. However, other forms of housing orientation sensor can be utilized. For example, sensors based on bubbles in liquid filled tubes are known to the art. Such housing orientation sensors are used in head-mounted displays utilized in artificial reality systems and laser leveling devices. In addition, housing orientation sensors based on sensing the orientation of the sensor relative to the magnetic field of the earth are also known.

Figure 2:
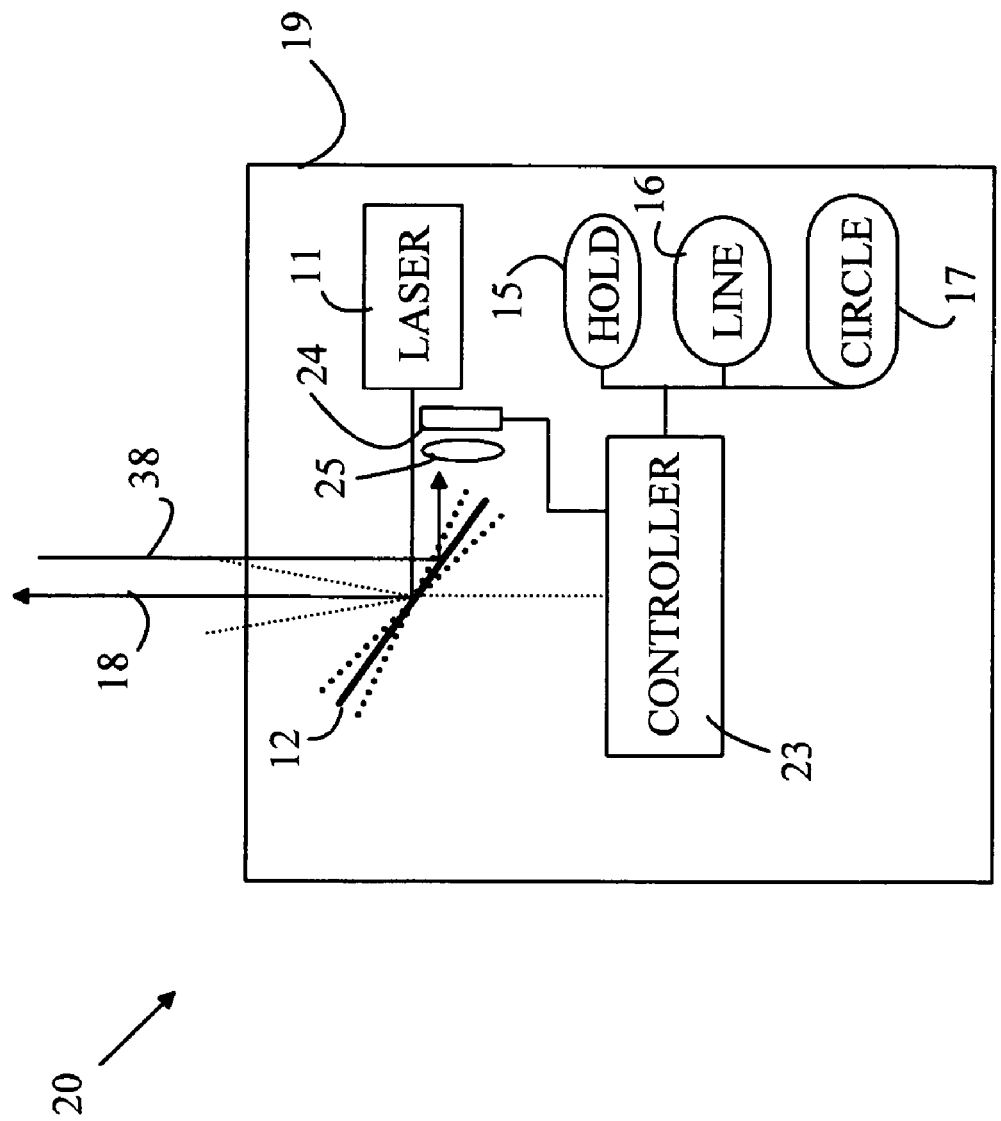
FIG. 2 illustrates a laser pointer 20 according to another embodiment of the present invention.

Refer now to FIG. 2, which illustrates a pointing device 20 according to another embodiment of the present invention. To simplify the following discussion, those elements of pointing device 20 that serve functions that are analogous to functions discussed above with reference to pointing device 10 have been given the same numeric designations used in FIG. 1 and will not be discussed further here. Pointing device 20 utilizes an image sensor such as a camera to form an image of the scene being projected on the screen. The lens 25 of the camera focuses the light 38 from an image at infinity onto an imaging array 24. The image provided to the camera is the image as seen reflected in mirror 12. Controller 23 operates a servo loop that adjusts the position of mirror 12 such that the image received on imaging array 24 remains the same as long as hold button 15 is depressed.

The light from the laser tends to be much brighter than the scene to which the user is pointing. If the servo loop operates by computing the correlation between successive images from the camera, this bright spot can dominate the correlation computation and cause errors. Such artifacts can be reduced by including a filter that removes the spot created by the laser. The filter can be included in the camera. Since the laser has a vary narrow bandwidth, an interference filter that removes light in a very narrow band about the laser wavelength will, in general, not substantially alter the remaining parts of the image. Alternatively, the controller can process the images with an algorithm that limits the amplitude of the pixels, and hence, reduces the intensity of the spot corresponding to the laser.

Figure 3:
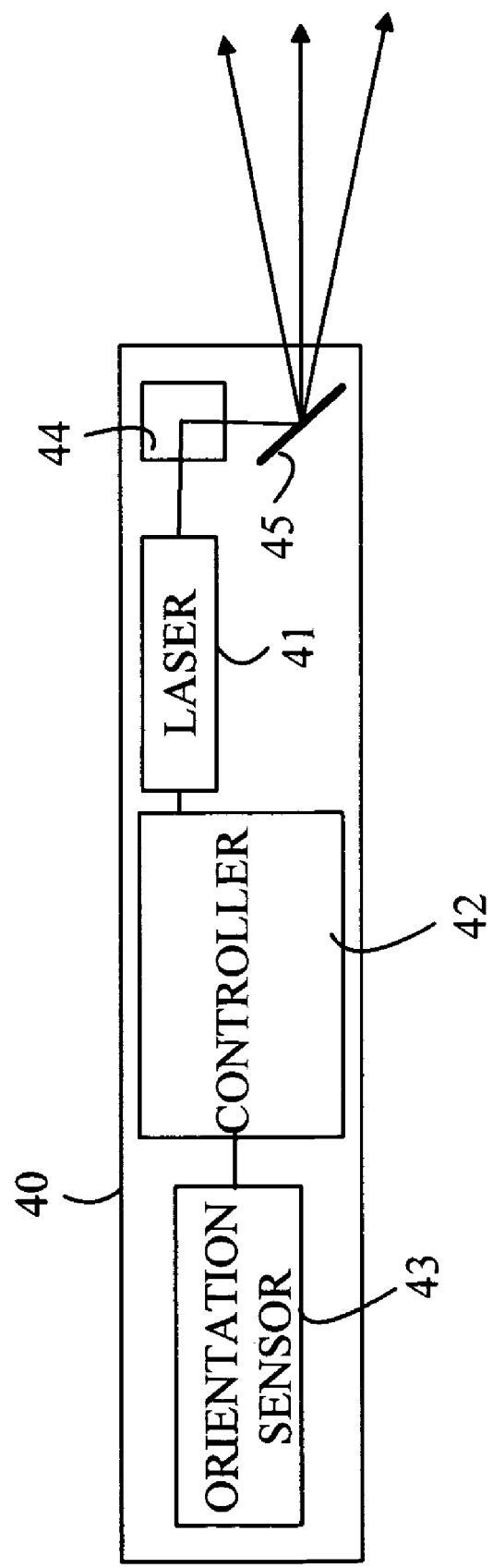
FIG. 3 illustrates an embodiment of the present invention that utilizes two mirrors to implement the beam steering assembly.

The above-described embodiments of the present invention utilize a steering assembly that includes a mirror assembly that rotates about two axes to compensate for the motion of the pointer housing. It will be appreciated, however, that an equivalent mirror assembly can be implemented by providing two separate mirrors that are mounted such that each mirror moves about one axis provided the axes are not parallel to one another. Refer now to FIG. 3, which illustrates an embodiment of the present invention that utilizes two mirrors to implement the mirror assembly. Pointing device 40 includes a laser 41, controller 42, and housing orientation sensor 43. The mirror assembly utilizes a first mirror 44 that rotates about an axis that is perpendicular to the plane of the paper and a second mirror 45 that rotates about an axis that is orthogonal to the axis of mirror 44.

The above-described embodiments of the present invention utilize a housing orientation sensor that measures the total change in the orientation angle of the housing and then corrects for that change in orientation when a button on the pointer is pressed. Such embodiments require a mirror assembly that has sufficient dynamic range to compensate for the measured change in housing orientation angle. Embodiments of the present invention that only compensate for the short-term jitter of the user's hand require less dynamic range. In such an embodiment, the housing orientation sensor includes a high-pass filter that removes the portion of the tilt signal corresponding to slow movements of the user's hand. That is, the output of the housing orientation sensor represents changes in the tilt angle that occurred within some predetermined short time period. If the pointing device does not include the features associated with generating underlines, and the like, this jitter correction mode can be left in the "on" state, and hence, the user does not need to actuate this mode by pressing a button on the pointer.

Figure 4:
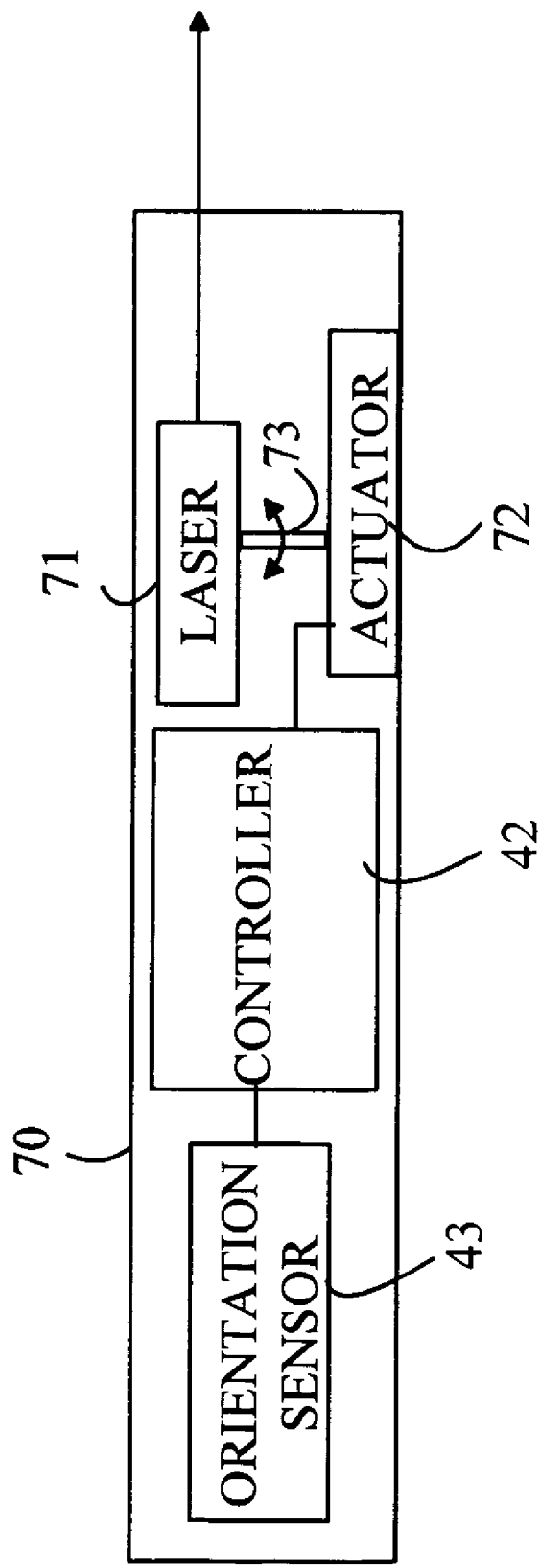
FIG. 4 illustrates a pointing device according to another embodiment of the present invention.

The embodiments of the present invention described above utilize a mirror assembly to steer the laser beam. However, other beam steering mechanisms can be utilized. For example, the mirror assembly could be replaced by an electro-optic prism assembly. In another embodiment, the orientation of the laser within the housing is altered. Refer now to FIG. 4, which illustrates a pointing device according to another embodiment of the present invention. Pointing device 70 utilizes a laser 71 that is mounted on a mechanical actuator 72 that is fixed to the housing. Actuator 72 rotates the laser about axis 73. A similar actuator can be included in the laser to provide rotation about a second axis.

Figure 5:
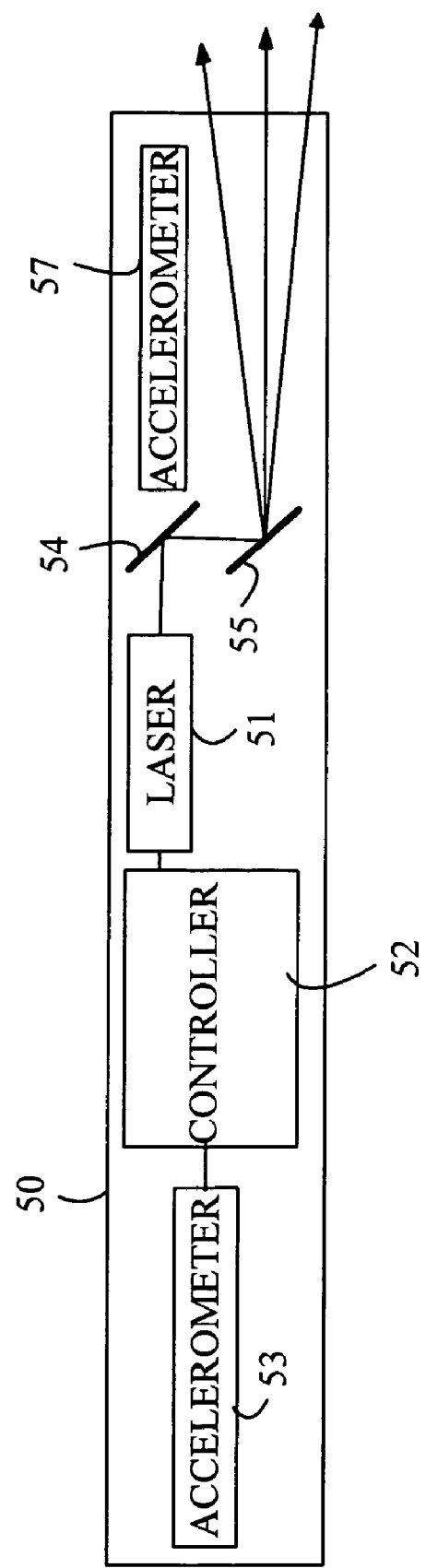
FIG. 5 illustrates a pointing device according to another embodiment of the present invention.

Refer now to FIG. 5, which illustrates a pointing device according to another embodiment of the present invention. Pointing device 50 utilizes a housing orientation sensor that is constructed from accelerometers to stabilize the position of the spot generated by laser 51. The two accelerometers shown at 53 and 57 are used to detect rotation of pointer 50 about an axis that is perpendicular to the plane of the drawing. A similar pair of accelerometers can be used to detect rotation of pointer 50 about an axis that lies in the plane of the drawing. To simplify the drawing, this second pair of accelerometers has been omitted from the drawing. The various accelerometers are connected to controller 52 that also controls mirrors 54 and 55, which operate in a manner analogous to mirrors 44 and 45 discussed above with reference to FIG. 3. To simplify the drawing, the connection between accelerometer 57 and controller 52 has been omitted.

Consider the movement of mirror 55, which is assumed to rotate about an axis that is also perpendicular to the plane of the drawing. The motion of the pointer can be viewed as a combination of a translation and rotation. The goal of the control algorithm in this embodiment is to cancel out any high frequency rotational movements. When pointer 50 rotates, accelerometer 57 measures an acceleration that is opposite to that measured by accelerometer 53. In contrast, when pointer 50 is merely translating, the accelerometers measure the same acceleration. Hence, by forming a difference signal from the two accelerometers and integrating that signal, the angular velocity of pointer 50 about an axis perpendicular to the plane of the paper can be measured and regulated to get the change in orientation. Mirror 55 is then caused to rotate in the opposite direction by an amount that cancels the change, but in the opposite direction. To limit the rotational correction to the high frequency movements characteristic of a user with a shaking hand, accelerometers 53 and 57 can be provided with an appropriate high-pass filter to remove the portion of the signals corresponding to low-frequency movements of pointer 50.

Various modifications to the present invention will become apparent to those skilled in the art from the foregoing description and accompanying drawings. Accordingly, the present invention is to be limited solely by the scope of the following claims.

What is claimed is:

1. A pointing device comprising:
   a handheld housing;
   a laser that generates a light beam that exits said housing;
   a beam steering assembly for causing said light beam to move relative to said housing;
   a housing orientation sensor that measures the orientation of said housing; and
   a controller that operates said beam steering assembly to compensate for changes in said housing orientation in response to a state of a first actuating button during the time that said light beam is generated and exits said housing and, in response to a state of a second actuating button, directs said beam steering assembly such that the emitted light beam moves in a desired pattern.

2. The pointing device of claim 1 wherein said housing orientation sensor comprises a filter for limiting said measurements to changes in said housing orientation that occur in less than a predetermined period of time.

3. The pointing device of claim 1 wherein said beam steering assembly causes said light beam to move angularly with respect to said handheld housing.

4. The pointing device of claim 1 wherein said beam steering assembly comprises a mirror assembly.

5. The pointing device of claim 1 the desired pattern is a straight line.

6. The pointing device of claim 1 wherein the desired pattern is a circle.

7. The pointing device of claim 1 wherein said housing orientation sensor comprises a gyroscope.

8. A pointing device comprising:
a handheld housing;
a laser that generates a light beam that exits said housing;
a beam steering assembly for causing said light beam to move relative to said housing;
an image sensor that measures the orientation of said housing, the image sensor integrated within the handheld housing; and
a controller that operates said beam steering assembly to compensate for changes in said housing orientation in response to a state of a first actuating button during the time that said light beam is generated and exits said housing and, in response to a state of a second actuating button, directs said beam steering assembly such that the emitted light beam moves in a desired pattern.

9. The pointing device of claim 8 wherein said image sensor forms an image of a scene reflected from said mirror assembly, and wherein said controller executes a servo loop that reduces changes in said image when a first manually actuated input device is actuated.

10. The pointing device of claim 8 further comprising an accelerometer.

11. A pointing device comprising:
a handheld housing;
a laser that generates a light beam that exits said housing;
a beam steering assembly for causing said light beam to move relative to said housing;
a housing orientation sensor that measures the orientation of said housing;
a controller that operates said beam steering assembly to compensate for changes in said housing orientation;
a first input device, wherein said controller operates said beam steering assembly to compensate for said changes in said housing orientation in response to said first input device being actuated; and
a second input device, said controller operating said beam steering assembly to cause said light beam to execute a predetermined pattern when said second input device is actuated.

12. The pointing device of claim 11 wherein said pattern comprises a straight line.

13. The pointing device of claim 11 wherein said pattern comprises a circle.

14. A method for operating a hand-held pointing device comprising:
providing a handheld housing comprising:
a laser that generates a light beam that exits said housing; and
a beam steering assembly for causing said light beam to move relative to said housing;
measuring the orientation of said handheld housing relative to a fixed reference outside of said hand-held housing;
responding to a first input by operating said beam steering assembly to compensate for changes in said orientation during the time that said light beam is generated and exits said housing; and
responding to a second input by operating said beam steering to execute a predetermined pattern.

15. The method of claim 14 wherein said beam steering assembly causes said light beam to move angularly with respect to said handheld housing.

16. The method of claim 14 wherein measuring said orientation is limited to measuring changes in said orientation that occur in less than a predetermined period of time.

17. The method of claim 14 wherein measuring the orientation of said housing comprises responding to an image captured within the handheld housing.

18. The method of claim 14 wherein said pattern comprises a straight line.

19. The method of claim 14 wherein said pattern comprises a circle.

* * * * *